Figure 1:
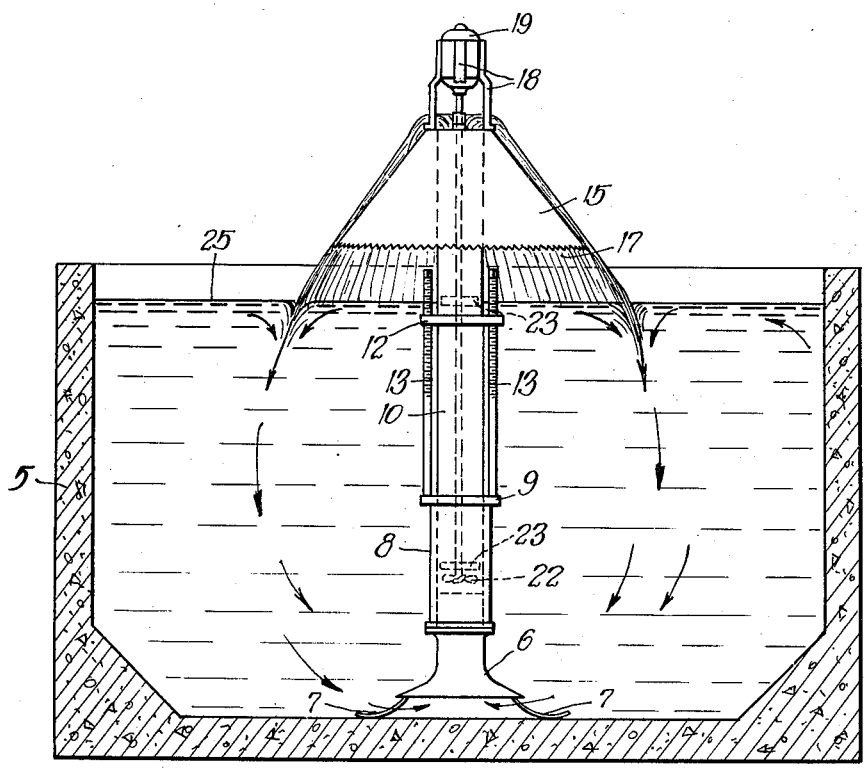

Sept. 12, 1939.  J. D. WALKER  2,172,646

ACTIVATED SLUDGE APPARATUS

Filed June 20, 1936

Inventor:
James D. Walker
By Brown, Jackson, Boettcher & Dienner
Attys.

Patented Sept. 12, 1939

2,172,646

UNITED STATES PATENT OFFICE 2,172,646

ACTIVATED SLUDGE APPARATUS

James Donald Walker, Aurora, Ill., assignor to The American Well Works, Aurora, Ill., a corporation of Illinois Application June 20, 1936, Serial No. 86,238

3 Claims. (Cl. 261—112)

This invention relates to activated sludge apparatus, and more particularly is directed to improved means for aerating sewage liquor.

In the activated sludge process, the problem of supplying oxygen to the aerobic bacteria feeding on the sludge particles, in order to produce the desired oxidation of the complicated nitrogenous compounds in the sewage into the simpler nitrates and nitrites, is of primary importance. It is this process which rids the sewage of its putrescent and putrescible compounds by conversion into wholesome and inoffensive compounds.

The activated sludge system, in its broader aspects, contemplates running sewage into a tank and there mixing it with a quantity of "activated sludge" which is a mixture of many species of aerobic bacteria suspended in water. The bacteria adhere to the surfaces or pores of minute particles or flocs of zoogleal or gelatinous material. The floculii are suspended in the water and, with it, form a liquor that flows like water. This liquid, or sludge, may thus be described as a uniform, flucculent suspension of the sewage solids accumulated from the suspended and colloidal solids present in sewage under aerobic conditions, and is rich in aerobic organisms.

These organisms, however, are active only in the presence of air, and the problem has consequently been one of providing means for incorporating air into the liquid in the aeration tank to allow these organisms to purify the sewage. One such type of aeration is disclosed in my prior Patent No. 2,082,759, issued June 1, 1937.

The present invention, in its preferred embodiment, is directed to improved treatment apparatus for treating the sewage, which operates upon the principle of drawing the liquor from the tank into the lower end of a centrally located vertically extending tube, and then circulating this liquor upwardly through the tube and discharging it at the upper end of the tube over a surface which allows the liquor to come into contact with the surrounding atmosphere. From this surface, the liquid, by gravity, flows down into and penetrates the surface of the liquor in the tank.

A further object of the present invention is the provision of improved aeration apparatus which incorporates minute particles of the air into the liquor which is drawn upwardly through the tube and discharged above the surface of the liquor in the tank. This incorporation of air into the liquor is accomplished by the phenomenon known as "skin friction", whereby the downwardly dropping streams of liquid carry along therewith, in contact with the surfaces thereof, air particles, which air particles are dragged along with the liquor as it penetrates below the surface of the liquor in the tank, and move downwardly into the body of liquid in the tank. The depth of penetration of the liquor, as well as the cross-sectional area of the individual streams, controls the amount of air which may be introduced into the liquor, and thus controls the amount of aeration produced.

Another feature of the present invention is the provision of means whereby the fall of the liquid from the upper end of the tube, and consequently the depth of penetration, can be adjusted in order to vary the amount of aeration desired.

Other objects and advantages of the present invention will appear more fully from the following detailed description, which, taken in connection with the accompanying drawing, will disclose to those skilled in the art the particular construction and operation of a preferred form of the present invention.

Figure 2:
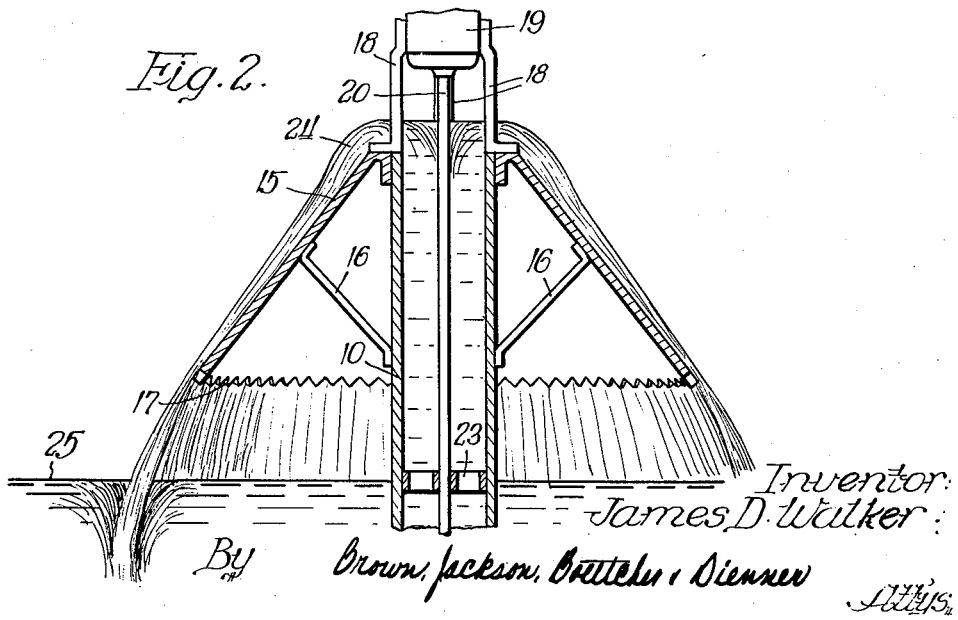

Referring in detail to the drawing, in which Figure 1 is a vertical sectional view through an aeration tank provided with the present type of aerating apparatus, and in which Figure 2 is an enlarged sectional view of the upper end of the aerating apparatus; I provide a tank, indicated generally at 5, which may be formed of concrete, or any other suitable material, and suitably reinforced and waterproofed to provide a convenient reservoir for the sewage liquor. Disposed substantially centrally in the tank 5, if the tank is of square section, or disposed at suitable intervals throughout the length of the tank if it be of rectangular form, I provide aerating apparatus for the purpose of introducing oxygen into the sewage liquor.

This aerating apparatus comprises a conically shaped outwardly flared member 6 disposed adjacent the bottom of the tank 5, and supported upon suitably spaced legs 7 which may or may not be rigidly secured to the botom of the tank. The cone 6 at its upper end terminates in an upwardly extending conduit 8, having the enlarged annular flange 9 at its upper end.

Telescopically mounted within the conduit 8 is the up-draft tube 10, which has its lower end projecting in and slidably mounted with respect to the interior of the conduit 8, and which carries, intermediate its ends, the flange or collar 12 which may be suitably secured thereto, as by welding or the like. The collar 12 is provided with a plurality of circumferentially spaced threaded openings adapted to receive the adjusting rods 13 which, at their lower ends, bear against the upper surface of the flange 9. The rods 13 are adjustably threaded with respect to the collar 12 in order to raise or lower the tube 10 with respect to the conduit 8, for a purpose to be hereinafter described.

Considering now the upper end of the tube 10, I have provided, about the outlet of the tube, a conically shaped member 15, which is suitably supported by means of the bracket members 16 at the upper end of the tube or conduit 10.

The member 15 is preferably in the form of a regular frusto conical section having its upper end coplanar with the upper end of the member 10. The periphery of the enlarged end of the member 15 is serrated, as indicated at 17, and the surface of the member 15, if desired, may be riffled or serrated for a purpose to be hereinafter described.

Mounted upon the upper end of the member 15 and the conduit 10 are a plurality of supporting arms 18, which in turn provide a suitable fixed support for a motor 19 disposed above and spaced from the upper end of the conduit 10. The motor 19 has connected thereto the downwardly extending shaft 20, which, at its lower end, is provided with the impeller 22 which serves to draw liquor from the tank upwardly through the cone 6 and the conduit 10 to the outlet of the conduit at the upper end thereof. A suitable bearing and journal support for the lower end of the shaft is indicated at 23.

In the operation of the structure thus far described, energization of the motor 19 results in rapid rotation of the impeller 22, drawing the liquor from the tank upwardly through the cone 6, and discharging this liquor outwardly at the upper end of the conduit 10. The liquor discharged from the upper end of the conduit 10, indicated at 24, flows by gravity down the external surface of the frusto conical member 15, thereby spreading the liquor outwardly in the form of a thin sheet over a relatively large area. If desired, suitable riffles or serrations may be provided in the surface of this conical spreader member to disturb the sheet-like continuity of the liquor, in order to expose as much of the surface of the liquor to air as possible. The lower end 17 of the member 15 is spaced from the surface of the liquor in the tank, indicated at 25, so that the liquor moving down the surface of the member 15 has a free fall from the lower end of this member into the surface liquor of the tank. The serrations 17 serve to break the flowing conical sheet of liquor up into a plurality of individual streams or to disturb its surface in such manner as to increase the interface to allow more air to come in contact with the surface of the liquor falling from the cone.

These streams, as they penetrate into the surface of the liquor, indicated in more detail in Figure 2, carry the air which is in contact with the surface thereof into the liquor, and penetrate down below the surface of the liquor. This results in incorporating minute particles of air with the falling streams as they penetrate into the surface of the liquor in the tank 5, thereby carrying air, and consequently oxygen, into the tank liquor. The amount of penetration will be determined by the slope of the member 15, and also by the height of the member 15 above the surface 25 of the liquor in the tank. The greater the height the greater the penetration, and consequently the greater entrainment of minute particles of air in the liquor in the tank, thus producing a greater aerating effect.

By adjustment of the members 13, the amount of aeration can be controlled in accordance with any predetermined requirements, and the cross-sectional area of the tube 10 and the capacity of the impeller 22 will also determine the amount of liquor that is moved upwardly and then discharged downwardly into the surface liquor. Thus, by control of the mass and cross-sectional area of the liquor, as well as by control of the penetration, due to the height from which it falls, the amount of aeration can be effectively controlled. It is obvious that the greater the distance of fall, the greater will be the velocity of the discharged liquor as it contacts the surface of the liquor in the tank, and consequently the greater will be the depth of penetration. Also, the cross-sectional area of the liquor streams will determine the surface contact of air therewith, and thus will control the amount of air that is carried into the liquor in the tank by the downwardly discharged streams.

It is to be understood that the particular form of the member 15 shown herein can be varied to meet varying conditions, and its size and shape can be proportioned to the particular tank with which it is to be employed, in order to get the proper radial spacing of the penetrating streams so that no short-circuiting of any portion of the liquor in the tank is produced. Also, the serration 17 may be omitted in certain circumstances where it is found that it is unnecessary to break the stream up to an extent such as produced by the serrations. Also, it may be found that the vertical adjusting means 13 can be eliminated, since, for a certain tank volume and a certain type of sewage, the amount of serration necessary can be predetermined, and the aerating apparatus can be constructed to produce the desired penetration of liquor without any adjusting means.

I am aware that various changes in design and construction of the present invention are possible, and therefore do not intend to limit the invention except as defined by the scope and spirit of the appended claims.

I claim:

1. Aeration apparatus comprising a vertically extending tube having an outwardly flaring lower end forming a liquor inlet, a second tube telescoping in said first tube, means carried by said first tube for adjusting said second tube axially with respect to said first tube, a frusto conical member about the upper end of said second tube and having its small end coplanar with the said end of said second tube, and an impeller carried adjacent the lower end of said second tube and movable conjointly therewith.

2. Aeration apparatus for an aeration tank comprising a first tube supported centrally in said tank and opening into the bottom thereof, a flange on said tube at its upper end, a second tube telescoping in said first tube and having its upper end projecting above the level of liquor in the tank, a flange carried by said second tube intermediate its ends, threaded adjusting means seated in the first tube flange and operatively engaging the second tube flange for varying the combined length of said tubes, an impeller carried in said second tube adjacent the lower end thereof for forcing liquor upwardly through said tubes, and a frusto-conical member at the upper end of said second tube and terminating in a serrated edge disposed below and radially outwardly of said upper end of said second tube and above the liquor level in said tank.

3. Aeration apparatus for a sewage treatment tank comprising a substantially vertical lower tube disposed in said tank with its lower end in position to draw liquid from the lower portion of said tank, an upper tube having telescopic engagement with said lower tube, an outwardly and downwardly flaring spreader member associated with said upper tube and having its lower edge spaced above the normal level of the liquid in said tank, an electric motor mounted above said spreader member with its axis extending substantially vertically, a shaft extending downwardly from said motor into said upper tube, an impeller on said shaft disposed within one of said tubes and operative to impel liquid upwardly through said tubes and outwardly over the upper surface of said spreader member for free fall therefrom into the main body of liquid within said tank, and means for adjusting said upper tube and said spreader member axially with respect to said lower tube to adjust the height of free fall of the liquid from said spreader member to the main body of liquid in said tank.

JAMES D. WALKER.